April 22, 1924.

H. E. OWENS

COASTER

Filed March 7, 1922

1,491,731

Inventor
H. E. Owens,
By
Attorney

Patented Apr. 22, 1924.

1,491,731

UNITED STATES PATENT OFFICE.

HEMAN E. OWENS, OF COUDERSPORT, PENNSYLVANIA.

COASTER.

Application filed March 7, 1922. Serial No. 541,872.

*To all whom it may concern:*

Be it known that HEMAN E. OWENS, a citizen of the United States of America, residing at Coudersport, in the county of Potter and State of Pennsylvania, has invented new and useful Improvements in Coasters, of which the following is a specification.

The object of the invention is to provide a toy or amusement vehicle of the coaster type adapted to support the occupant in any desired position of the latter without involving the risk of injury and under conditions permitting of the control of the direction of progress of the vehicle either by the occupant or by an attendant; and with these objects in view the invention consists in a construction and combination of parts of which a preferred embodiment is shown in the accompanying drawings, wherein.

Figure 1:
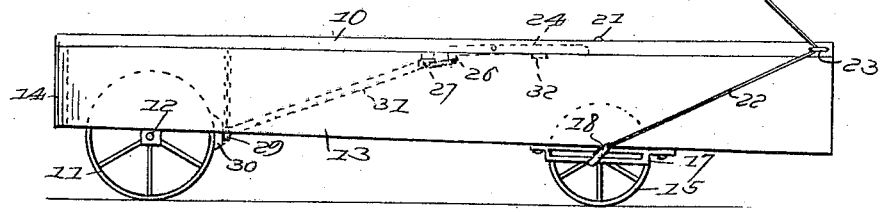
Figure 1 is a side view of a vehicle embodying the invention.
Figure 2:
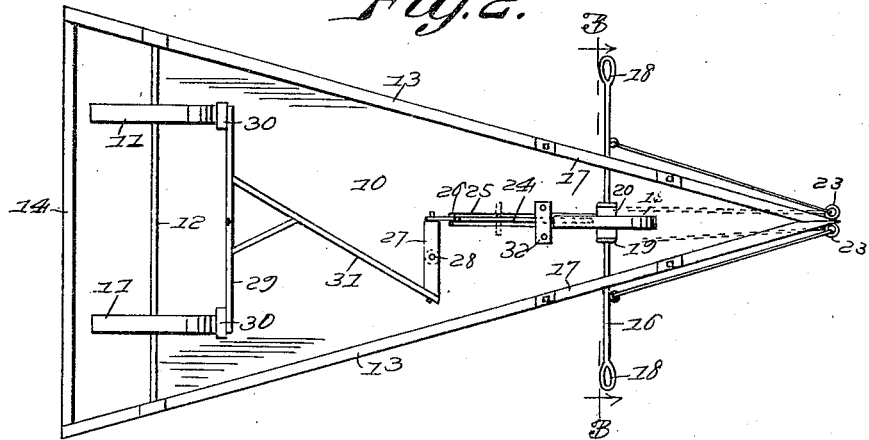
Figure 2 is a plan view inverted of the same.
Figure 3:
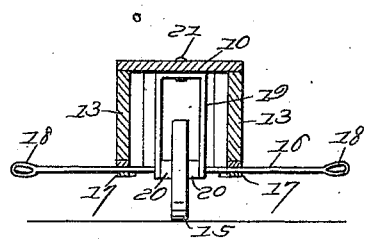
Figure 3 is a cross section on the plane indicated by the line 3—3 of Figure 2.

The base or floor 10 of the vehicle which is preferably of triangular form with the acute angle of the triangle directed forwardly, is supported at its rear end by the transversely spaced near wheels 11 mounted upon a transverse axle 12 which is secured terminally in side aprons or skirts 13 depending from the side edges of the base and connected at their rear ends by a similar apron or skirt 14 so that only the lower portions of the wheels are exposed. At its front end the base or platform is supported by a single dirigible wheel 15 mounted upon an axle 16 which extends through guides 17 on the lower edges of the side aprons or skirts and is extended to form foot rests 18 to permit of the steering of the vehicle by the feet of a rider seated on the platform or base. A yoke or fork 19 having bearings 20 in which the front axle is mounted is pivoted as at 21 to the under side of the base or platform and serves as a hanger and a means for limiting the movement of the axle, and a looped cord 22 terminally connected with the front axle is adapted to extend in an upwardly and forwardly inclined position to a guide loop 23 attached to the front end of the base or platform for use as an additional means of steering and for draft.

In connection with this device it is preferred to employ brake mechanism which in the construction illustrated embodies a hand lever 24 normally arranged horizontally in a slot 25 in the plane of the base or platform so as to offer no projection beyond or obstacle upon the surface of the platform which may catch or injure the occupant in the case of sliding thereon, said lever having a down turned arm 26 at its rear end pivotally connected with one end of a rocker 27 horizontally disposed beneath the platform or base and pivoted at an intermediate point as shown at 28, and a brake bar 29 supported at the lower end of the swinging hanger bar 29' and carrying brake shoes 30 for respective engagement with the rear wheels 11 and having a stem 31 which is connected with the other end of the rocker 27. The hand lever is held from downward displacement by a transverse strap 32 spanning the slot in a base or platform and to apply the brake as will be obvious it is only necessary to raise the front end of the hand lever in order to cause a movement of the rocker in the direction to rearwardly move the stem 31 and bring the brake shoes into contact with the desired force with the tires of the rear wheels.

While the general contour in plan of the vehicle is shown in the drawing as of triangular or substantially triangular form having the side edges thereof arranged in a forwardly convergent relation as being particularly adapted for convenient use by a single occupant or passenger, it will be understood that modifications of this shape may be adopted particularly when the car is designed for occupancy by more than one operator or passenger.

Having described the invention, what is claimed as new and useful is:—

1. A vehicle of the coaster type having a horizontal base of triangular form, rear wheels supporting the base at the rear end, a steering wheel supporting the base at the forward end and provided with an axle extended to provide laterally disposed foot rests, guide eyes disposed at the forward end of the base, and a loop cord terminally connected with the front axle and extending upwardly and forwardly through the guide eyes in the manner and for the purpose specified.

2. A vehicle of the coaster type having a horizontal base of triangular form provided with side and rear end depending aprons, laterally spaced rear supporting wheels having an axle arranged in parallelism with the rear edge of the base and carried at the lower edges of said side aprons, a dirigible front wheel having an axle extended and terminally formed with foot rests, and guides mounted on the lower edges of the side aprons on opposite sides of the front wheel, said axle extending through said guides which are elongated longitudinally to provide for lateral movement of the axle upon turning of the wheel.

In testimony whereof he affixes his signature.

HEMAN E. OWENS.